July 4, 1944.  E. SCHUTZ  2,353,088
CUTTING MACHINE
Filed Aug. 11, 1942  2 Sheets-Sheet 1

INVENTOR
EWALD SCHUTZ
BY
Ramsey, Kent, Chisholm & Lutz
ATTORNEYS

Patented July 4, 1944

2,353,088

UNITED STATES PATENT OFFICE 2,353,088

CUTTING MACHINE

Ewald Schutz, Lancaster, Pa., assignor to De Walt Products Corporation, Lancaster, Pa., a corporation of Pennsylvania Application August 11, 1942, Serial No. 454,365

10 Claims. (Cl. 308—6)

This invention relates to cutting machines in which a cutting tool is mounted at the free end of a reciprocatory arm. The invention is particularly applicable to machines in which the tool is a circular saw or cutting disc, and the invention will be disclosed and discussed in connection with such a machine.

In certain sawing machines, particularly for woodworking, the saw is so mounted that it can be readily reciprocated over a work-table on which is placed the lumber to be cut. One way of doing this is to attach the saw assembly to a carriage which can travel back and forth on a stationary horizontal arm which projects over the work-table. This has the advantage that the operator has only a relatively small load to reciprocate as he moves the saw back and forth. Another way is to provide a reciprocatable horizontal arm which projects over the work-table, and attach the saw assembly to the forward end of the arm. With this arrangement the arm and the saw assembly are reciprocated as a unit. This has the advantage that the arm moves back out of the way as the saw is moved back. However, this arrangement has the disadvantage that it is relatively difficult to reciprocate the saw. The reciprocatory arm tends to bind in its support due to the heavy overhanging weight. Also, the operator must reciprocate a considerably increased weight. Furthermore, difficulty has been experienced in so mounting such a reciprocatory arm that it will not twist, have side sway, or permit chattering, particularly when heavy lumber is being cut.

General objects of the present invention are to provide a cutting machine having a reciprocatory tool-carrying arm which is rigid, which is easy to reciprocate, and which maintains quite accurate straight line movement without objectionable twisting or side sway.

Another object of the invention is to provide for cutting machines an inexpensive, reliable, rugged, and easily adjusted reciprocatory arm structure.

Various other and specific objects of the invention will be apparent to those skilled in the art from the following disclosure.

Fig. 1 of the drawings is a perspective view of the present invention as applied to a cutting machine utilizing a circular saw.

Figure 1:
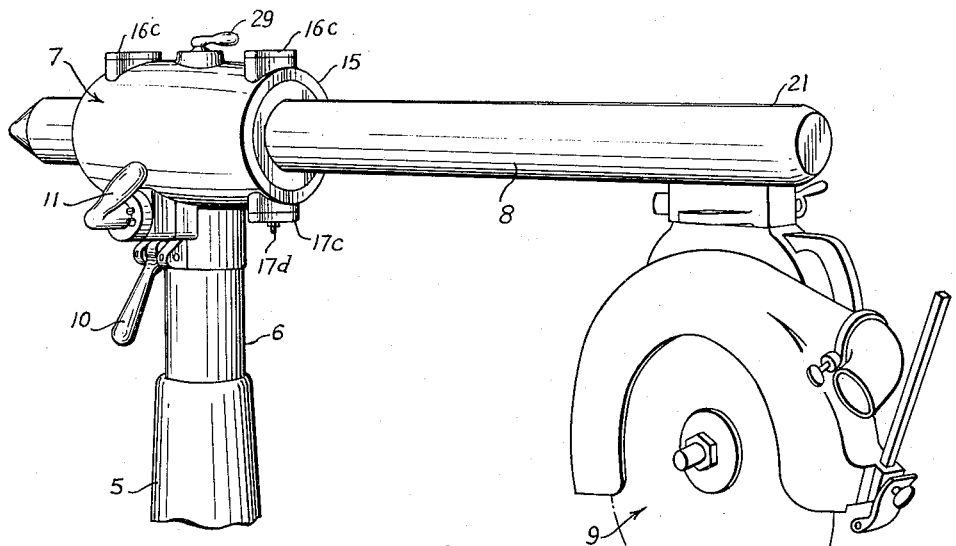

Stationary column 5 has a vertically extensible portion 6 at the top of which is mounted an arm support designated as a whole by 7. Reciprocatably supported by the support 7 is a tubular horizontal arm 8 which projects over a work-table (not shown). Attached to the free end of arm 8 is a motor driven circular saw unit designated as a whole by 9. This unit may be of any well-known and suitable type. Ordinarily the unit 9 is so constructed that the saw blade can be swung on vertical and horizontal axes to set the blade in different positions for different types of cuts.

When the machine is being operated, arm support 7 is locked to column element 6 which is non-rotatable. However, the support 7 may be unlocked and moved swivelly with respect to the column, to place arm 8 in different angular positions lying in a horizontal plane. Handle 10 may operate a latch member that is engageable with various notches (not shown) so located as to set the arm 8 in angular positions which are used frequently. If it is desired to set the arm 8 in positions not corresponding to any of the notches, clamping means controlled by handle 11 may be used to clamp support 7 to column element 6. These features, however, are not part of the present invention.

The support 7 has a horizontally disposed cylindrical body 15 which may be cast in one piece. The body 15 is formed with a top pair of vertical guideways 16, 16 one of which guideways is adjacent to each end of the body 15. Directly beneath guideway 16, 16 is a second pair of vertical guideways 17, 17. The four guideways 16, 16 and 17, 17 telescopically receive bearing blocks 16a, 16a and 17a, 17a, respectively, all of which blocks may be identical. In these blocks there are mounted identical rolling bearing units designated as a whole by 16b, 16b and 17b, 17b, respectively.

Figure 3:
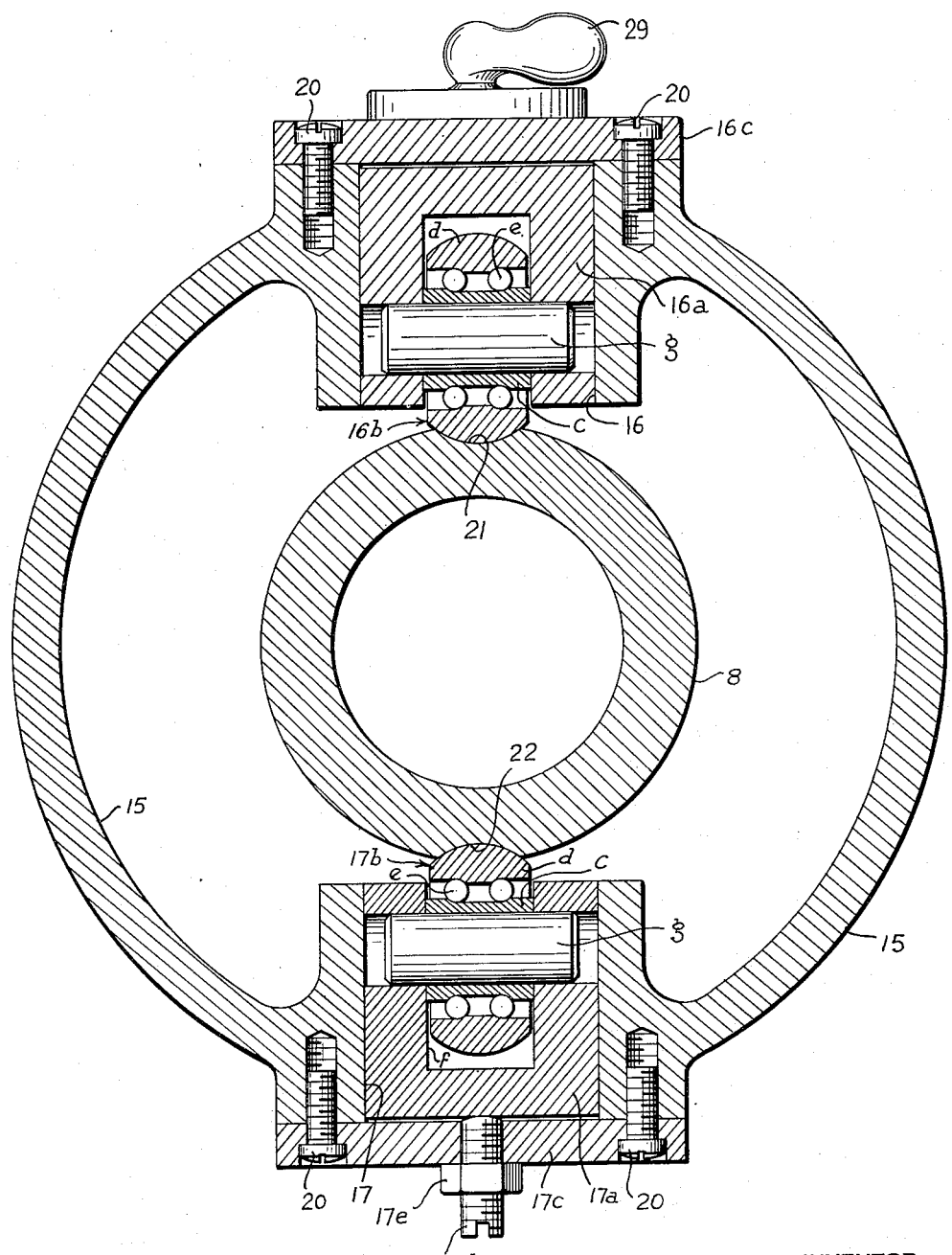
Fig. 3 is a cross section, on a larger scale, taken in general on the line 3—3 of Fig. 2.

Each rolling bearing unit has an inner race member c, an outer race member d, and intervening balls or other rolling elements e. Each of the four bearing blocks is slotted at f; and, as seen in Fig. 3, the inner race member c snugly spans the space between the sides of slots f. Pins g hold the ball bearing units in place in the bearing blocks.

The rolling bearings having been assembled into the blocks 16a, 16a and 17a, 17a, the blocks are telescoped into the respective guideways 16, 16 and 17, 17, which they fig snugly. The guideways are then closed by caps 16c, 16c and 17c, 17c, which may be held in place by screws such as 20 (Fig. 3). The peripheries of outer race members d are of arcuate cross section and fit into top and bottom arcuate grooves 21 and 22 in arm 8. These grooves are parallel, run longitudinally of arm 8, and are diametrically opposite one another on the arm. The lower caps 17c, 17c are provided with adjustment screws 17d, 17d and lock nuts 17e, 17e. These screws are adapted to elevate bearing blocks 17a, 17a. Thus, screws 17d, 17d can be adjusted to elevate blocks 16a, 16a to their top positions and to establish the proper bearing contact between race members d and arm 8. Readjustment of screws 17d, 17d, may be made, from time to time, to compensate for wear.

Directly above arm groove 21, the body 15 is provided with a hollow boss 25. Telescoped into this boss, and secured by screws 26, 26 is a plug-like element 27 provided with a threaded pressure member 28. Member 28 may be rotated by handle 29 to apply pressure to nose piece 30 which fits into groove 21. Nose piece 30 is held captive by pin 31 which projects into bore 32 in the back of the nose piece. It will be apparent that by operation of handle 29, nose piece 30 may be clamped into groove 21 to secure the arm 8 in any desired extended or retracted position with respect to its support 7.

Figure 2:
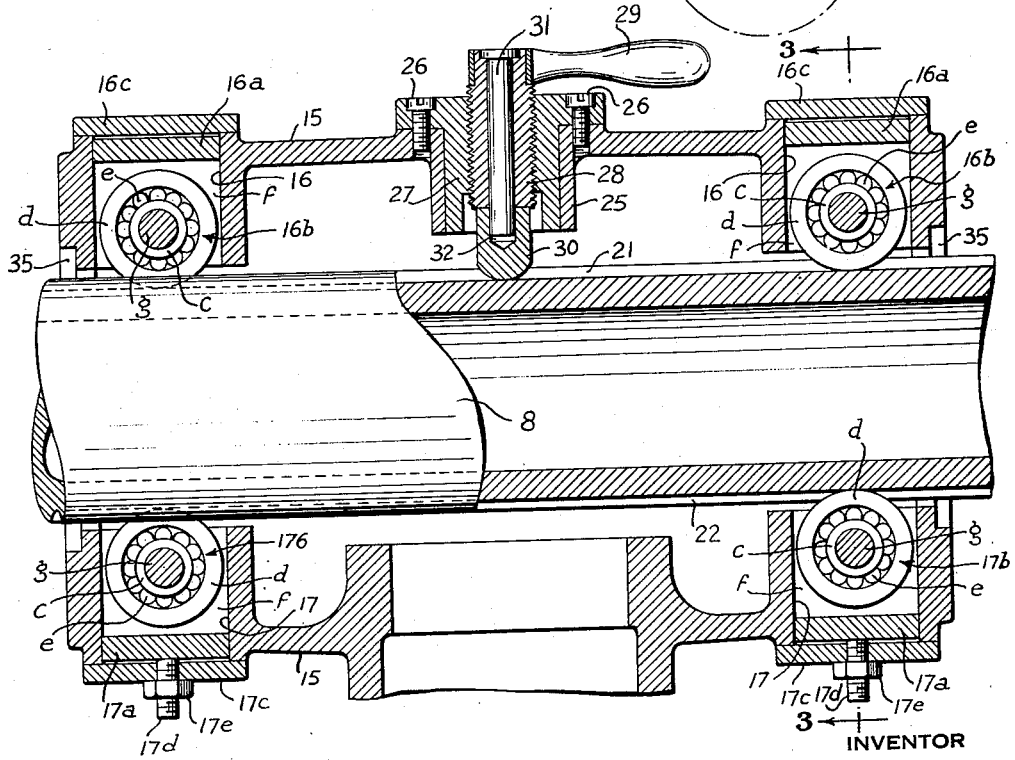
Fig. 2 is substantially a central vertical section taken longitudinally through the arm supporting structure shown in Fig. 1.

The tubular structure of arm 8 provides rigidity without great weight. The arm is supported and guided by the upper and lower pairs of rolling bearing, the bearing of each pair being spaced quite a distance apart along the length of the arm. Thus the arm move may be reciprocated freely without binding. As previously explained, inner race members c are held snugly by the sides of slots f in the bearing blocks. The rolling bearings themselves are of such construction as to resist end thrust therein (see Fig. 3). By virtue of said thrust-resisting character of each of these bearings, the arm 8 is accurately guided and rotative or twisting movement of the arm abouts its axis is positively precluded. If desired, dust caps or rings may be inserted in annular seats 35, 35 (Fig. 2) to prevent dust from entering housing 15 and reaching the rolling bearings.

Grooves 21 and 22 extend substantially the entire length of arm 8, but a short ungrooved portion may be left adjacent to the ends of the arm, particularly the rear end (see Fig. 1). At full forward stroke of the arm, this will engage one of the rolling bearings and act as a stop.

In compliance with the patent statutes I have disclosed the best form in which I have contemplated applying my invention. It will be realized, however, that the disclosure is illustrative and not limiting.

What I claim is:

1. In a machine of the class described, having a support and a horizontal arm reciprocatively supported by the support, the improvement which comprises: the arm being provided with two longitudinally extending grooves, one on top of the arm and the other on the bottom of the arm; and the support being provided with two pairs of rolling bearings, one pair on top of the arm and the other pair on the bottom of the arm; the two rolling bearings comprising each said pair being mounted in spaced relation lengthwise of said arm and the rolling bearings having peripheral portions which enter the groove and laterally engage the grooves, thereby holding the arm against rotation.

2. In a machine of the class described, having a support and a horizontal arm reciprocatively supported by the support, the improvement which comprises: the arm being provided with two longitudinally extending grooves, one on top of the arm and the other on the bottom of the arm, and the support being provided with two pairs of rolling bearings, one pair on top of the arm and the other pair on the bottom of the arm the two rolling bearings comprising each said pair being mounted in spaced relation lengthwise of said arm, and the rolling bearings having peripheral portions which enter the grooves; and the support also being provided with an adjustable clamp member which enters one of said grooves.

3. In a machine of the class described, having a support and a horizontal arm reciprocatively supported by the support, the improvement which comprises: the arm being provided with two longitudinally extending grooves, one on top of the arm and the other on the bottom of the arm, and the support being provided with two pairs only of rolling bearings, the bearings having inner and outer race members held against axial play relative to one another, one pair of the bearings being on top of the arm and the other pair of bearings being on the bottom of the arm, and the outer race members entering the grooves and holding the arm against rotation and sidewise movement relative to said support.

4. In a machine of the class described, a horizontally disposed housing, top and bottom vertical guideways incorporated in the housing adjacent to both ends thereof, bearing blocks in the guideways, rolling bearings carried by the blocks, and a horizontal reciprocatory arm supported and guided by said bearings, the blocks for at least some of said bearings being adjustable toward and away from said arm, and the arm having longitudinal grooves engaged by the peripheries of the rolling bearings.

5. In a machine of the class described, a horizontally disposed housing, a top pair of vertical guideways incorporated in the housing, a bottom pair of vertical guideways incorporated in the housing, each of the four guideways being adjacent to an end of the housing, pairs of bearing blocks in the respective pairs of guideways, one pair of blocks being arranged for a degree of vertical movement, rolling bearings carried by the blocks and held captive thereby, a horizontal reciprocatory arm supported and guided by said bearings, the arm having top and bottom longitudinal grooves engaged by the peripheries of said bearing, and adjustment means to move one pair of said blocks toward said arm.

6. In a machine of the class described, a horizontally disposed housing, a top pair of vertical guideways incorporated in the housing, a bottom pair of vertical guideways incorporated in the housing, each of the four guideways being adjacent to an end of the housing, pairs of bearing blocks in the respective pairs of guideways, one pair of blocks being arranged for a degree of vertical movement, rolling bearings carried by the blocks and held captive thereby, the bearings having inner and outer race members separated by rolling elements, a horizontal reciprocatory arm supported and guided by said bearings, the arm having longitudinal grooves engaged by the outer race members of said bearing, and adjustment means to move one pair of said blocks toward said arm.

7. In a machine of the class described, a support, upper and lower pairs of rolling bearings carried by the support, the bearings having inner race members held captive by the support and having outer race members with peripheries which are of arcuate cross section, and a reciprocatory arm supported and guided by said bearings, the arm having upper and lower longitudinal grooves which are of arcuate cross section and engage and fit the arcuate peripheries of said bearings, whereby the bearings hold the arm against rotation.

8. A two-line mounting for a reciprocating tool arm, comprising: a pair of diametrically-oppositely disposed grooves in said arm which extend parallel to the arm axis, the side walls of each of said grooves converging toward the respective groove root, a stationary support member traversable by said arm, and annular rolling bearing members journaled in said support member for rotation on axes perpendicular to said arm, said bearings each having a peripheral portion received in a groove and constrained, by snug contact with the convergent side walls thereof, to limit relative movement between said tool arm and said support member to straight linear motion devoid of rotative play.

9. A two-line mount for a reciprocable tool, comprising: an elongate arm, a pair of grooves provided at diametrically-opposite sides of said arm and extending lengthwise thereof, each of said grooves diminishing in width toward its respective groove root, a body member, said arm being received within said body member and axially movable relative thereto; captive rolling bearings journaled in said body member on spaced axes perpendicularly transverse of said arm, said bearings having marginal annular portions snugly disposed for rolling travel in said grooves with the sides of said grooves in closely-fitted guide-contact with the sides of said marginal bearing portions, said bearings being of the precision thrust-resisting type effective, with said grooves, to constrain said arm and body member to precision straight-line relative movement and preclude relative rotation and sidesway therebetween.

10. A two-line mount for a reciprocable tool, comprising: an elongate arm, a pair of longitudinal grooves diametrically-oppositely positioned respectively at the top and bottom of said arm with their common plane passing through the center of gravity of said arm, said grooves each diminishing in width toward the axis of said arm, a body member, said arm being received within said body member and axially movable relative thereto; captive rolling bearings journaled in the top and bottom of said body member on spaced axes perpendicularly transverse of said arm, said bearings having marginal annular portions snugly disposed for rolling travel in said grooves with the sides of said grooves in closely fitted guide-contact with the sides of said marginal bearing portions, said bearings being of the precision thrust-resisting type effective, with said grooves, to constrain said arm to precision straight-line movements characterized by positive maintenance of said grooves and rolling bearings in a common vertical plane passing through the center of gravity of said arm.

EWALD SCHUTZ.